(12) United States Patent
Broy et al.

(10) Patent No.: US 6,405,361 B1
(45) Date of Patent: Jun. 11, 2002

(54) AUTOMATICALLY GENERATING A PROGRAM

(76) Inventors: Manfred Broy, Franz-Josef-Strausse-Strasse 12, 82041 Oberhaching (DE); Radu Grosu, Lichtenfelser Strasse 13 D-81243, München (DE); Ingolf Krüger, Am Weiher 27 D-85716, Unterschleissheim (DE)

( * ) Notice: Subject to any disclaimer, the term of this patent is extended or adjusted under 35 U.S.C. 154(b) by 0 days.

(21) Appl. No.: 09/378,204

(22) Filed: Aug. 19, 1999

(30) Foreign Application Priority Data

Aug. 20, 1998 (DE) .......................................... 198 37 871

(51) Int. Cl.⁷ ................................................ G06F 9/45
(52) U.S. Cl. ................................................ 717/1; 717/4
(58) Field of Search ........................ 717/1, 2, 4; 714/35, 714/36, 38, 45; 703/27; 370/261; 379/205.01; 455/426, 416, 67.1

(56) References Cited

U.S. PATENT DOCUMENTS

| | | | | |
|---|---|---|---|---|
| 4,802,116 A | * | 1/1989 | Ward et al. ................... | 395/500 |
| 5,721,926 A | * | 2/1998 | Tamura ....................... | 395/701 |
| 5,828,829 A | * | 10/1998 | Yamauchi et al. ............. | 714/38 |
| 5,946,490 A | * | 8/1999 | Lieberherr et al. ........... | 395/707 |
| 6,002,869 A | * | 12/1999 | Hinckley .................... | 395/704 |
| 6,029,002 A | * | 2/2000 | Afifi et al. .................. | 395/707 |
| 6,163,692 A | * | 12/2000 | Chakrabarti et al. .......... | 455/416 |
| 6,260,186 B1 | * | 7/2001 | James ......................... | 717/1 |
| 6,260,188 B1 | * | 7/2001 | Ungpiyakul et al. ........... | 717/1 |
| 6,272,338 B1 | * | 8/2001 | Modzelesky et al. .......... | 455/426 |
| 6,282,681 B1 | * | 8/2001 | Sun et al. .................... | 714/738 |
| 6,289,502 B1 | * | 9/2001 | Garland et al. ............... | 717/2 |

FOREIGN PATENT DOCUMENTS

| | | |
|---|---|---|
| EP | 0 049 176 A1 | 7/1981 |
| EP | 0 343 682 B1 | 5/1989 |

OTHER PUBLICATIONS

Jonsson, Compositional specification and verification of distributed systems, ACM, 1994, pp 259–303.*
Lamport, "A simple approach to specifying concurrent systems", Comm. of the ACM, 1989, pp 32–45.*
Kung et al., "Object–oriented real time systems modeling and verification", IEEE, 1997, pp 224–231.*

* cited by examiner

Primary Examiner—Kakali Chaki
(74) Attorney, Agent, or Firm—Blakely, Sokoloff, Taylor & Zafman LLP

(57) ABSTRACT

A method, an apparatus and a computer program product are described for automatically generating a state-based program for a component of a system consisting of a plurality of components communicating with each other, wherein the program is generated from a specification of the system, the specification comprising interaction-based sequence descriptions of the system. According to the present invention, all sequence descriptions of said component are determined, the sequence descriptions are normalized, a state-based specification of said component is determined from the normalized sequence descriptions, and the state-based program for the component is determined from the state-based specification. The present invention facilitates the process of program development since the costly, manual development of a state-based program from the specification of a system is automated at least to a substantial degree.

20 Claims, 5 Drawing Sheets

AUTOMATICALLY GENERATING A PROGRAM

FIELD OF THE INVENTION

The present invention concerns the field of automatic program generation. The program is generated for a component of a system consisting of several components that communicate with each other. The particular field of the present invention is the automatic generation of a state-based program for a component on the basis of a given, interaction-based specification of the system. The invention is particularly intended to be used in connection with complex, interacting programs, for example for telecommunication applications.

BACKGROUND OF THE INVENTION

Program development generally takes place today in a multi-stage process. Initially, the requirements for the system to be developed are collected and first ideas regarding the solution are drawn up. Later these first solution ideas are refined step by step until finally an executable implementation in the form of a program is obtained.

In particular, interaction-based formalisms are known for specifying a system of communicating components in the early stages of the development. A specification in such a formalism comprises descriptions of possible execution sequences of the system, the communication (interaction) between the components of the system being emphasized. Examples for interaction-based sequence descriptions are message sequence charts (MSCs) according to recommendation Z.120 of the ITU (International Telecommunication Union) as well as sequence diagrams in UML (Unified Modeling Language) of the OMG (Object Management Group).

A very high effort in terms of human working time is required if an executable program shall be developed without automatic support from this kind of interaction-based specification of the system. In this respect, problems arise both because of the ensuing costs and because of the long development time, which can not be shortened by more than a certain degree even if the number of co-workers is increased. Moreover, the development process is very prone to errors, especially in connection with complex, interacting applications, which are, for example, common in the field of telecommunications. As a rule, a major part of the overall costs must be allotted for the searching and correcting of errors.

EP 0 343 682 B1 and its German translation DE 689 23 126 T2 each describe a system for automated programming. EP 0 049 176 A1 describes a program composing method based on test data inputs.

OBJECTS AND SUMMARY OF THE INVENTION

Accordingly, one object of the present invention is to avoid the above-mentioned problems fully or at least in part. Another object is to shorten the process of program development. Another object is to decrease the necessary effort for program development. Another object is to avoid possible sources of error. Another object of the invention is a full or partial automation of the stages of program development from the interaction-based system specification to the executable program. Another object is to provide this automation in the context of communicating and possibly distributed systems.

According to the invention, these and other objects are attained by a method, an apparatus and a computer program product for automatically generating a state-based program for a component of a system consisting of a plurality of components communicating with each other, wherein said program is generated from a specification of said system, said specification comprising interaction-based sequence descriptions of said system, and wherein the following steps are performed:

a) determining all sequence descriptions of said component defined by said specification of said system, b) normalizing said sequence descriptions of said component such that a normalized sequence description comprises exactly one initial condition and exactly one final condition and, between said initial condition and said final condition, communication actions only, c) determining a state-based specification of said component by identifying all equal initial and final conditions of said normalized sequence descriptions of said component with a single state, and d) determining said state-based program for said component, wherein each sequence description contained in said state-based specification of said component is replaced by a sequence of said communication actions of this sequence description, separated by additionally inserted states.

The dependent claims concern preferred embodiments of the invention.

No fixed order shall be defined by the enumeration of steps in the claims. Rather, the individual steps and sub-steps can be executed in the order recited in the claims, or in another order or parallel or quasi parallel or interleaved with each other or interleaved with steps of other concurrent calculations. The use of the indefinite article in the expression ". . . automatically generating a state-based program . . . " is intended to comprise the situation that in a single execution of the steps of the invention several state-based programs are generated together, each such program for one component of the system.

The invention is based on the idea to automatically generate a state-based program from the specification of the system by means of a sequence of appropriate transformation steps. Thus the invention facilitates the development process considerably, since the costly, manual transformation is no longer necessary. The programming effort is shifted towards producing the system specification. In other words, the invention extends the functionality of known compilers since the automatic program generation no longer requires a source code in a programming language, but a mere system specification is sufficient.

The starting point of the invention is a specification of a system consisting of several components communicating with each other. In particular, the components may be data processing devices that are locally separated from each other, as this is often the case, for example, in the field of telecommunication applications. The components, however, may also be separated from one another from a merely logical point of view, for example, in order to structure the system or to shield the components from each other. In this case the components may be concurrent processes in a data processing system or even individual modules of a larger program. Intermediate forms between the two extremes of a strictly local and a strictly logical separation are contemplated as well.

The communication between the components is possible in all manners, for example via unidirectional or bidirectional communication channels or by means of synchronizing communication mechanisms. Arbitrary protocols are possible for performing the communication. In particular, the components may be connected with each other via networks or suitable operating system services. Communication via common registers or memory regions is possible as well.

According to the invention, the specification of the system comprises interaction-based sequence descriptions. For example, such sequence descriptions are message sequence charts (MSCs) or UML sequence diagrams, which have already been mentioned initially. Only the information contents of these descriptions with respect to possible execution sequences of the system is relevant for the present invention; the actual textual and/or graphical representation does not matter. Therefore all description techniques in which system components and their interaction can be represented are suitable as system specifications.

As a result of the method of the present invention, a state-based program is generated for each component of the system. This program may also have an arbitrary textual and/or graphical representation. It is only important that states and state transitions as well as communication actions are described by the program.

In preferred embodiments the state-based program is represented by a finite automaton (directed graph with initial state and accepting finite states) or a Büchi automaton (directed graph with initial state and acceptance condition) or a representation in SDL (SDL=Specification and Description Language of the ITU) or a Statechart automaton or a ROOM automaton (ROOM=Real-Time Object-Orientated Modeling).

With respect to finite automata, reference is made generally to the book "Einführung in die Automatentheorie, Formale Sprachen und Komplexitätstheorie" by J. E. Hopcroft and J. D. Ullman, Addison-Wesley, 2nd corrected reprint, 1993. In particular, methods for deriving executable programs from descriptions of automata are shown on pages 47 seq. of this book. The book "Real-Time Object-Orientated Modeling" by B. Selic, G. Gullekson and P. T. Ward, Wiley, 1994, contains a description of ROOM automata as well as tools like, for example, ObjecTime (http://www.objectime.com), said tools being adapted for executing descriptions of automata and for transforming them into other programs. The explanations contained in these references and in the English original of the above-mentioned book by J. E. Hopcroft and J. D. Ullman ("Introduction to Automata Theory, Formal Languages and Computation", Addison-Wesley, 1979) are herewith incorporated into the present specification in their entirety.

Other state oriented formalisms and languages are possible for the state-based program in other preferred embodiments. The state-based program preferably is an executable program. It may be immediately executable by a suitable computer, or it may be executable by means of a suitable interpreter, or it may be translatable by means of a suitable compiler into executable code. In alternative embodiments, additional manual refinement steps may be necessary for obtaining an executable program.

Preferred fields of application of the invention are the fields of telecommunication and of computer networks, in particular in connection with implementing complex protocols for all kinds of switching devices, intermediate stations and terminals, for providing an exchange of data and messages that is flexible and is shielded against functional errors. Furthermore, the invention may be used for generating programs for reactive systems, in particular feed-back and feed-forward control systems as components of technical devices (for example, in terotechnology, in automation systems, in avionics, in connection with motor vehicles, in telematics and/or in consumer electronics). Further fields of application of the present invention are the generation of user interfaces, in particular for devices of the technical fields mentioned above, as well as for the generation of data base query schemes.

Further features, objects and advantages of the present invention will be apparent from the drawings and the following detailed description.

DETAILED DESCRIPTION OF SAMPLE EMBODIMENT

Figure 1:
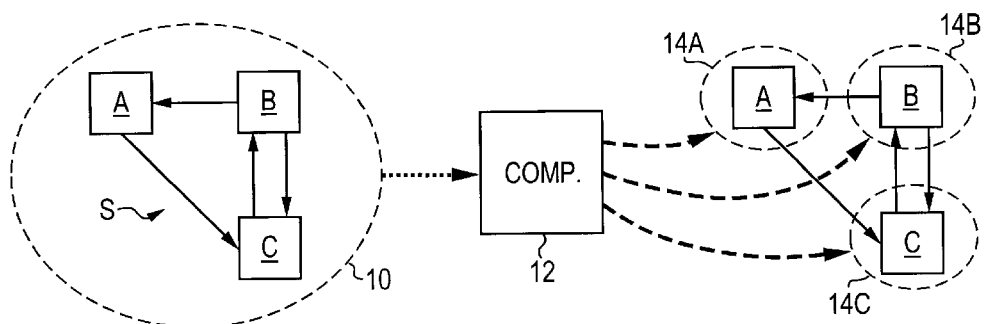
FIG. 1 a schematic representation of the automatic program generation according to the present invention, FIG. 2a to FIG. 2d examples for interaction-based sequence descriptions, FIG. 3 an example for a specification of a system, FIG. 4 a flow diagram of a sample embodiment of the present invention, FIG. 5 a sequence description of a component A, FIG. 6 a sequence description of component A with inserted initial and final conditions, FIG. 7a and FIG. 7b each a normalized sequence description of component A, FIG. 8 a state-based specification of component A, FIG. 9 a non-deterministic state-based program for component A, FIG. 10 a deterministic state-based program for component A, and FIG. 11a and FIG. 11b representations of state transitions, that are optimizable and optimized, respectively.

Several sample embodiments of the present invention will now be described in more detail, referring to the drawings.

The embodiment illustrated in FIG. 1 concerns a system S comprising three components A, B, C, each of said components A, B, C being an independent computer. The components A, B, C communicate with each other via unidirectional channels (shown in FIG. 1 as solid arrows), said channels being provided by suitable network services. A specification 10 of the system S describes the possible communication sequences (interactions) between the components A, B, C.

The specification 10 serves as an input (dotted arrow in FIG. 1) for a general purpose computer 12, for example a usual workstation, which automatically executes the method described herein. The computer 12 generates as its outputs (dashed arrows in FIG. 1) state-based programs 14A, 14B, 14C for each of the three components A, B, C. The programs 14A, 14B, 14C are immediately executable by the components A, B, C, said components A, B, C being provided with a suitable interpreter. Depending on the selection of the user, all three programs 14A, 14B, 14C for the three components A, B, C of the system S or only one or some of these programs 14A, 14B, 14C for the respective component(s) A, B, C may be generated.

The specification 10 of the system S comprises several interaction-based sequence descriptions, which in the present sample embodiment are message sequence charts (MSCs) according to recommendation Z.120 of the ITU. The contents of this recommendation are herewith included into the present specification. Four MSCs for components A and B are shown in FIG. 2a to FIG. 2d as examples and are there named ISS, A_ISF, A_TC and A_TE, respectively. For the sake of simplification, the respective communication partners of component A have been omitted in MSCs A_ISF, A_TC and A_TE.

Each component in a sequence description is represented by a vertical axis running from an open bar as the initial point to a closed bar as the end point. Communication actions between the components are represented by labeled arrows from the sender to the receiver. The labeling designates the kind of the message. For example, component A in FIG. 2a sends the message SREQ to component B, which in turn sends the message SACK to component A.

Furthermore, conditions may be associated with the components. A condition characterizes the state of the corresponding component at the time designated by the position of the condition on the component axis before or after the sending or receiving, respectively, of the message. For example, in FIG. 2a condition IDLE holds as the initial condition for component A before sending the message SREQ, and condition SENDING holds as the final condition after receiving the message SACK.

Figure 2A:
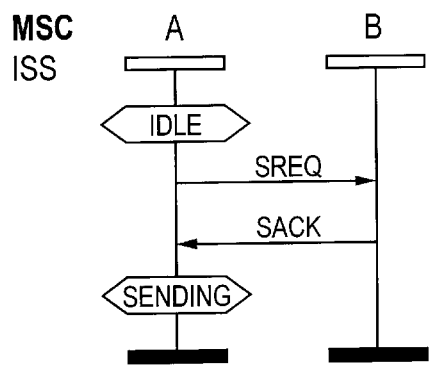
Figure 2B:
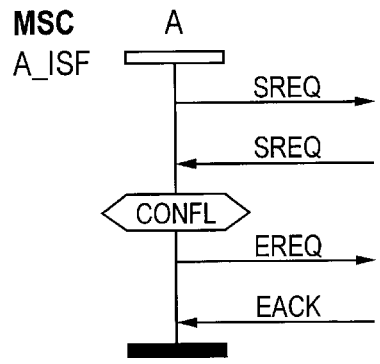
Figure 2C:
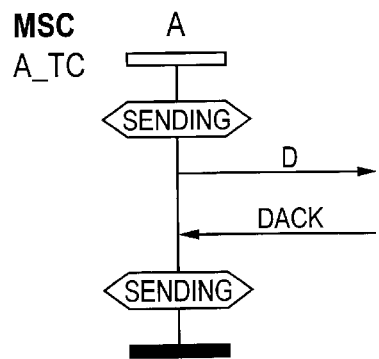
Figure 2D:
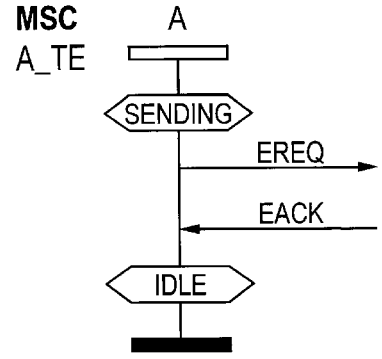
Figure 3:
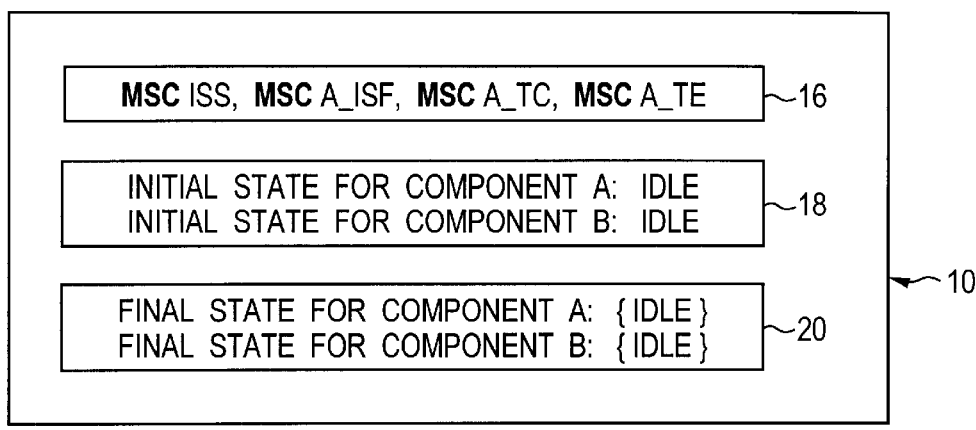

The specification 10 of the system S is illustrated in FIG. 3. In the sample embodiment described herein, the specification 10 comprises a total of four sequence descriptions 16 of the system S, i.e. MSCs ISS, A_ISF, A_TC and A_TE (as shown in FIG. 2a to FIG. 2d). Furthermore, data 18 concerning the initial state and data 20 concerning the possible final states of each component present in at least one of the sequence descriptions 16 are contained in the specification 10. The data 18 determine the initial state of the state-based program to be generated for the component, and the data 20 determine the admissible (accepting) final states. In alternative embodiments, the specification 10 may comprise further data, which are taken into account for program generation.

The generation of a state-based program for component A will now be explained with reference to the steps shown in the flow diagram of FIG. 4. In a first step 22, a sequence description is generated for each of those sequence descriptions 16 of the system S that comprise the component A, said generated sequence description being restricted to said component. In other words, the generated component sequence description is the projection of the system sequence description 16 to the component A. This projection is formed by removing all component axes different from A together with the conditions associated therewith, if these conditions are not also conditions of component A. Furthermore, all arrows (communication actions) that have neither their origin nor their destination at component A are removed.

Figure 5:
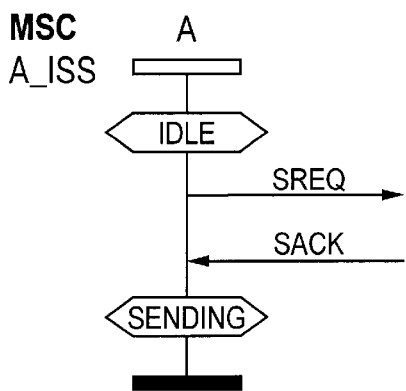

FIG. 5 shows, as an example for method step 22, MSC A_ISS representing a sequence description of component A derived from the system sequence description ISS (FIG. 2a). MSC A_ISS has been obtained by projecting MSC ISS onto component A by removing the axis of component B. The MSCs shown in FIG. 2b to FIG. 2d are already in the form of a sequence description of component A, such that no transformation steps are necessary any more in this respect.

In a second step 24 (FIG. 4), each of the now present sequence descriptions of component A is normalized. A normalized sequence description comprises exactly one initial condition and exactly one final condition and contains exclusively communication actions between these two conditions. In this respect, an initial condition is to be understood as a condition immediately following the initial point (open bar) of a component axis, and a final condition is a condition immediately preceding the end point (closed bar).

The step 24 of normalizing is executed in three sub-steps. In a first sub-step 26 a start condition is inserted into each sequence description of component A not beginning with a condition. The start condition corresponds to the initial state of component A as prescribed by the data 18.

Subsequently, in a second sub-step 28, a suitable final condition is inserted into each sequence description not ending with a condition. In the sample embodiment described herein, the inserted final condition is identical to the initial condition of the sequence description (which may either have been present initially or has been inserted in sub-step 26). In alternative embodiments other final conditions are possible. In further alternative embodiments, several sequence descriptions, which differ from each other only with respect to the inserted initial and/or final condition(s), may be generated from a single sequence description in sub-steps 26 and 28.

Figure 6:
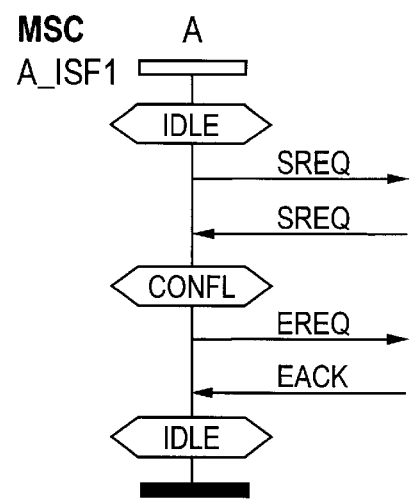

FIG. 6 shows, as an example, an MSC A_ISF1 obtained from MSC A_ISF (FIG. 2b) by performing the first two sub-steps 26, 28. The condition IDLE defined by the data 18 (FIG. 3) for component A has been inserted as the initial condition and the final condition. MSCs A_ISS (FIG. 5) and A_TC (FIG. 2c) and A_TE (FIG. 2d) already comprise a start condition and a final condition each, so that no transformations are necessary in this respect.

As a third sub-step 30 of the normalizing step 24, sequence descriptions that comprise further conditions apart from the start condition and the final condition are split. Each portion of such a sequence description, each said portion being delimited by two conditions, forms a new sequence description having these two conditions as the start condition and the final condition, respectively. Thus, each originally internal condition occurs once as a start condition and once as a final condition in the normalized sequence descriptions obtained in this way.

Figure 7A:
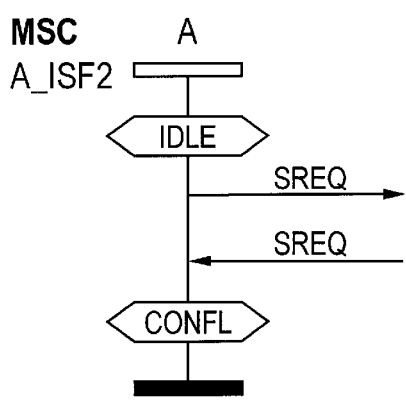
Figure 7B:
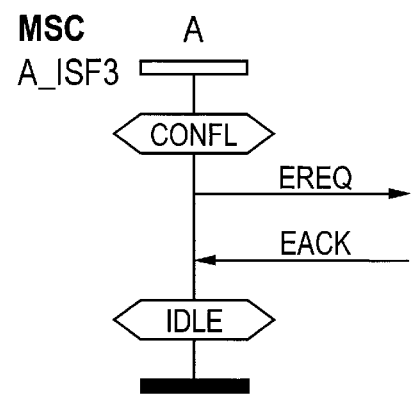

The result of the splitting performed in the third sub-step 30 is shown in FIG. 7a and FIG. 7b for the example of MSC A_ISF1 (FIG. 6). MSC A_ISF2 corresponds to the portion of MSC A_ISF1 from the initial condition IDLE up to the internal condition (and new final condition) CONFL. The portion of MSC A_ISF1 from CONFL to the final condition IDLE forms MSC A_ISF3. Thus MSCs A_ISF2 and A_ISF3 have been obtained from MSC A_ISF by normalization. MSCs A_ISS, A_TC and A_TE are already in normal form, such that no splitting takes place in sub-step 30.

A state-based specification is determined from the normalized sequence descriptions of component A as the third step 32. Such a state-based specification is an intermediate form between sequence descriptions and state-based programs. This means that there is already a notion of state, while state transitions are still represented by sequence descriptions.

In order to obtain the set of states of the state-based specification of component A, the set of normalized sequence descriptions of A, in the present sample embodiment, is partitioned in a way such that all sequence descriptions of a partition have the same initial condition. Each such partition, which will simply be identified with the corresponding initial condition in the following, forms a state of the state-based specification. Furthermore, each final condition occurring in a normalized sequence description of A forms a state, unless there is already a corresponding state. In other words, the set of states can be regarded as the set of all initial conditions and final conditions in the normalized sequence descriptions of A, wherein equal conditions form common states.

All normalized sequence descriptions of A serve as state changes (transitions) in the state-based specification. Each such sequence description defines a possible transition from the state corresponding to the initial condition to the state that is associated with the final condition. The initial state of the state-based specification of component A is the initial state identified by the data 18 (FIG. 3), and the final states defined by the data 20 correspond to the final states of the state-based specification.

Figure 8:
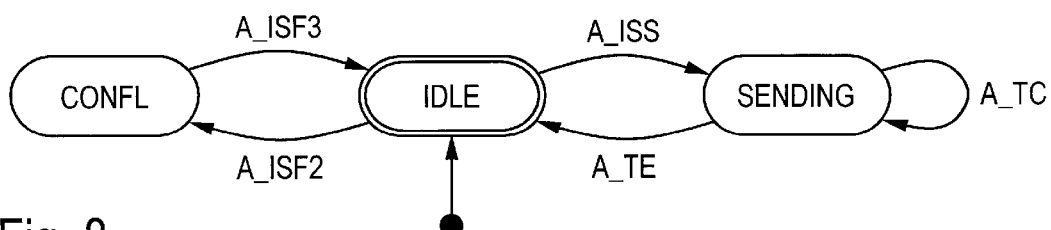

A state-based specification derived from MSCs A_ISS, A_ISF2, A_ISF3, A_TC and A_TE in step 32 is shown, as an example, in FIG. 8. The partition for the initial condition IDLE comprises MSCs A_ISS and A_ISF2, the partition for the initial condition SENDING comprises MSCs A_TC and A_TE, and the partition for the initial condition CONFL comprises MSC A_ISF3. Correspondingly, three states are formed, which are identified with the initial conditions IDLE, SENDING and CONFL, respectively. The transitions shown in FIG. 8 by arrows are labeled with the corresponding MSCs. The state IDLE is designated as the initial state by an arrow starting from a closed circle. The (single) final state is also the state IDLE. This is shown in FIG. 8 by a double border. The final state designates accepting calculations (calculations that have been completed successfully).

Figure 4:
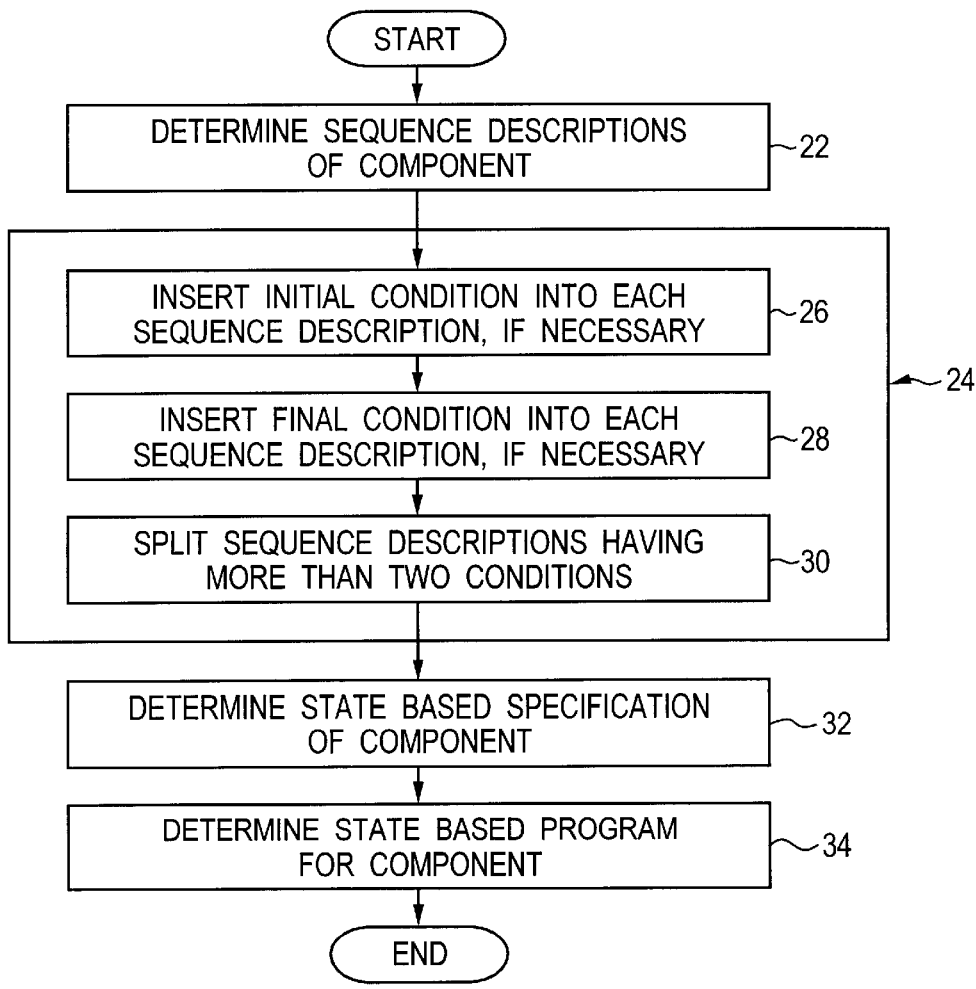

In a fourth step 34 of the method shown in FIG. 4, a state-based program is finally determined for component A. This program is generated as a finite automaton in the sample embodiment described herein. The set of states of the automaton as well as the initial state and the final states coincide with those of the state-based specification. The state transitions of the automaton are derived from the transitions of the state-based specification by substituting each sequence description forming a transition with a corresponding sequence of (new) states and transitions.

In more detail, first all sequence descriptions in which no exchange of messages takes place are substituted by ε-transitions in order to designate the possibility of a spontaneous state transition. Each other sequence description defines a total of k (k>0) communication actions, which will be termed $(d_1, n_1, c_1), \ldots, (d_k, n_k, C_k)$. In this respect, for $1 \leq i \leq k$, each $d_i$ designates the direction of the exchange of messages, each $n_i$ designates the message and each $c_i$ designates the names of the corresponding source and target components, respectively. The equation $d_i=$"?" holds for a received message, and $d_i=$"!" holds for a sent message.

For the case of k=1, the sequence description in the automaton is substituted by a transition that is labeled by the communication action $(d_1, n_1, c_1)$.

For the case of k>1, k−1 new states $s_1, \ldots, s_{k-1}$ as well as k transitions are added to the automaton. The first transition runs from the initial state of the underlying sequence description to the new state $s_1$ and is labeled by the communication action $(d_1, n_1, c_1)$. The k-th transition runs from the new state $s_{k-1}$ to the final state of the underlying sequence description and is labeled by $(d_k, n_k, c_k)$. All other transitions run from state $s_{i-1}$ to state $s_i$ (for 1<i<k) and are labeled by $(d_i, n_i, c_i)$.

Figure 9:
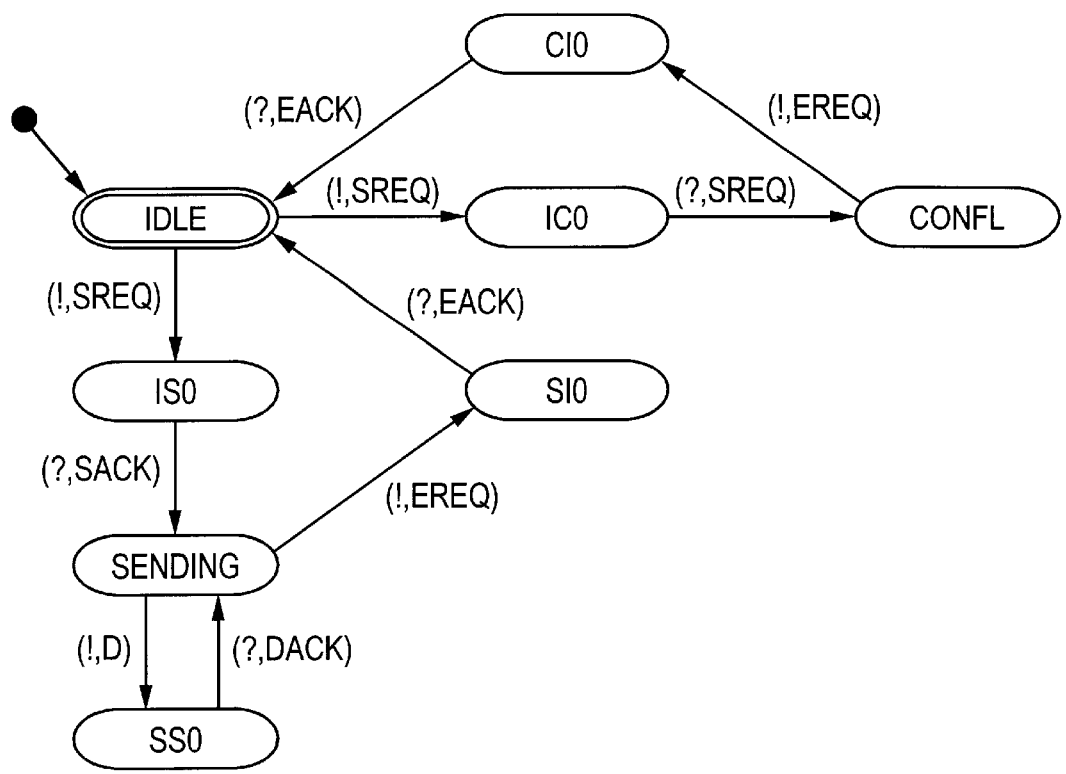

After all sequence descriptions of the state-based specification have been transformed in this manner, the state-based program has been obtained in the form of a non-deterministic automaton with input and output actions. This automaton is shown in FIG. 9, as an example, for the specification of FIG. 8. The automaton is represented in the form of a directed graph, wherein the nodes designate states and the edges of the graph designate permissible state changes. Initial and final states are marked in the same way as in FIG. 8. The edges of the automaton of FIG. 9 are labeled with communication actions; the source and target components having been omitted for save of simplicity. This means that arbitrary source and target components are admissible.

For example, during the transformation from the state-oriented specification (FIG. 8) to the state-oriented program (FIG. 9), the transition labeled by MSC A_ISF2 in FIG. 8 has been transformed into two transitions running from state IDLE via a new intermediate state IC0 to state CONFL. The first of these two transitions is labeled with the (simplified) communication action (!, SREQ). This indicates that the automaton may change its state from IDLE to IC0 if it sends the message SREQ to an arbitrary component in this process. Correspondingly, the automaton may change its state from IC0 to CONFL when receiving a message SREQ.

The non-deterministic automaton shown in FIG. 9 may already be the result of the automatic program generation process. In alternative embodiments, however, further transformation steps are performed. For example, the method may comprise the step of removing γ-transitions contained in the automaton, if any, by a method that is known per se and is described, for example, in the above-mentioned book "Einführung in die Automatentheorie, Formale Sprachen und Komplexitätstheorie" by J. E. Hopcroft and J. D. Ullman, Addison Wesley, 2. corrected reprint, 1993.

Furthermore, the automaton (free of γ-transitions) may be transformed into a deterministic automaton. A suitable subset construction method is described on pages 22 to 24 of the book just referenced. Finally a minimization of the state space of the deterministic automaton is advisable. This step can also be performed by means of a method known per se, for example the Myhill Nerode construction according to pages 72 to 76 of the book just mentioned.

Figure 10:
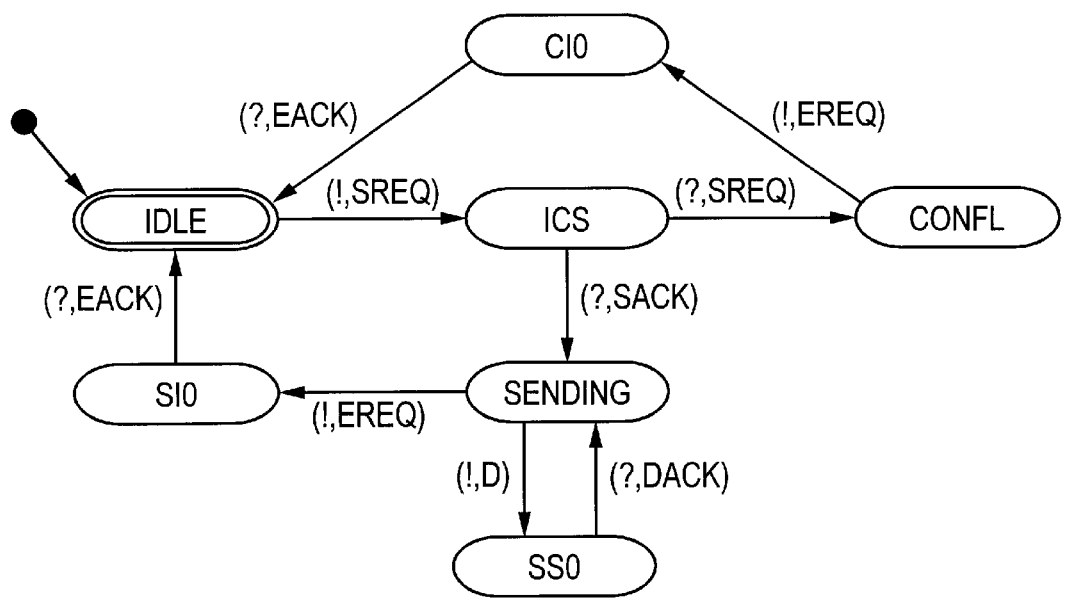

FIG. 10 shows, as an example, a deterministic automaton that has been derived from the automaton shown in FIG. 9 by the subset construction mentioned above. This automaton already is in minimal form, so that no further minimization step is necessary any more.

All in all, method steps 32 and 34 (FIG. 4) and the further steps mentioned above serve to generate an automaton with input and output for a component for which at least one sequence description in normal form is available, said automaton being minimal and being deterministic with respect to the input messages.

In some cases the projection of non-local conditions (i.e., conditions whose domain comprises more than a single component) onto a single component in step 22 (FIG. 4) limits the resulting automaton severely in the respect that a strong dependency on states of the environment arises. For example, the function of a switching component intended to forward messages from several senders may then depend on the interleaving of the messages of the senders. In alternative embodiments, this limitation is alleviated by further providing each specification 10 with a surjective mapping from non-local to local conditions for all those components that are contained in at least one sequence description. When performing the projection in step 22, the respective mapping provided for each component is used to replace non-local conditions by local conditions.

Other formalisms for the state-based program may be used in further alternative embodiments. For example, the nodes and/or the edges of the transition graph may be labeled with input and/or output events.

Figure 11A:
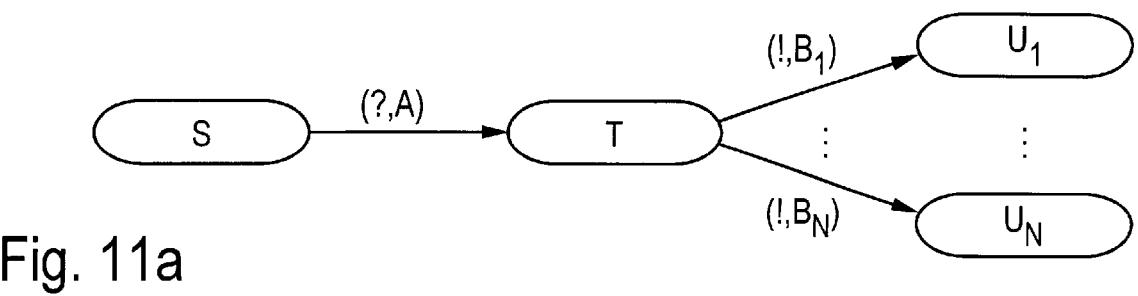
Figure 11B:
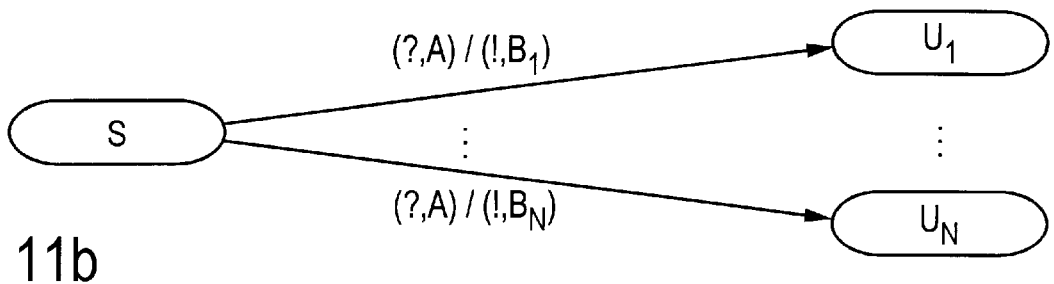

In other alternative embodiments, the state-based program is expressed in the formalisms SDL or Statecharts or ROOM by means of further transformation steps. These transformation steps may start from an automaton as shown in FIG. 10. As a possible optimization, state transitions according to the schema shown in FIG. 11a are identified and are replaced by transitions according to FIG. 11b. More in detail, states T of the automaton are identified whose incoming edges, coming, for example, from a state S, are labeled at most with messages of the form (?, A). Furthermore, exactly N (for N>0) transitions $(!,B_i)$ with target state $U_i$ (for $1 \leq i \leq N$) are assumed to have their origin in state T. In this situation, state T may be removed by replacing each transition $(!, B_i)$ originating in T and having a target state Us by a transition from S to $U_i$, said transition being labeled by $(?, A)/(!,B_i)$.

The automata generated by the methods described above can further be simplified in variant embodiments if the state space comprises a control state and a data state and if extended state machines with guarded state transitions and actions for changing the data state are used. Then, the conditions for the sequence descriptions are pairs of a control state and a data state each. Suitable concepts for such extended state machines are known per se, for example from the Statecharts and ROOM formalisms.

In the sample embodiments described above, the sequence descriptions only consisted of communication actions and conditions. In alternative embodiments, however, the method is extended to more powerful formalisms for the description of execution sequences and interactions. For example, sequence descriptions containing choice and repetition operators may be transformed by schematic transformations into the simpler sequence descriptions for which the method has been described above.

According to the sample embodiments described above, when normalizing a component sequence description in sub-steps 26 and 28 (FIG. 4), missing initial and final conditions have each been replaced by the initial states of the respective components as given in the specification 10 (data 18). In variant embodiments, each such component sequence description is replaced by a set of sequence descriptions, in each of which an arbitrary condition occurring in the component has been inserted in the place of the missing condition.

It can thus be seen that the invention can be used for creating computer-executable programs in a fully or at least partially automated way. The particulars in the above description of sample embodiments should not be construed as limitations of the scope of the invention, but rather as exemplifications of preferred embodiments thereof. Many other variations are possible and will be readily apparent to persons skilled in the art. Accordingly, the scope of the invention should be determined not by the embodiments illustrated, but by the appended claims and their legal equivalents.

We claim:

1. A method for automatically generating a state-based program for a component of a system consisting of a plurality of components communicating with each other, wherein said program is generated from a specification of said system, said specification comprising interaction-based sequence descriptions of said system, said method comprising the steps of:

a) determining all sequence descriptions of said component defined by said specification of said system,
   b) normalizing said sequence descriptions of said component such that a normalized sequence description comprises exactly one initial condition and exactly one final condition and, between said initial condition and said final condition, communication actions only,
   c) determining a state-based specification of said component by identifying all equal initial and final conditions of said normalized sequence descriptions of said component with a single state, and
   d) determining said state-based program for said component, wherein each sequence description contained in said state-based specification of said component is replaced by a sequence of said communication actions of this sequence description, separated by additionally inserted states.

2. The method of claim 1, wherein in step a) each sequence description of said system concerning said component is limited to a corresponding sequence description of said component.

3. The method of claim 1, wherein step b) comprises the following sub-steps:

b1) inserting a condition prescribed in said specification of said system as an initial condition into each of those sequence descriptions of said component that begin with a communication action,
   b2) inserting a condition prescribed in said specification of said system as a final condition into each of those sequence descriptions of said component that end with a communication action, and
   b3) splitting all sequence descriptions of said component having more than two conditions into a plurality of sequence descriptions of said component, each of the split sequence descriptions having exactly two conditions.

4. The method of claim 3, wherein at least one of sub-steps b1) and b2) is/are repeated for each of a plurality of conditions to be inserted in order to obtain a corresponding number of sequence descriptions of said component.

5. The method of claim 1, wherein said interaction-based sequence descriptions of said system are represented by at least one of Message Sequence Charts and UML sequence diagrams.

6. The method of claim 1, wherein said state-based program for said component is represented by an automaton.

7. The method of claim 6, wherein said automaton is one of an SDL automaton and a Statechart automaton and a ROOM automaton.

8. The method of claim 1, wherein said state-based program is based on an extended state automaton whose state space comprises a control state and a data state, and wherein state transitions are performed depending on the current data state and are adapted to change this data state.

9. The method of claim 1, wherein step d) comprises the step of removing ε-transitions from said state-based program.

10. The method of claim 1, wherein a deterministic state-based program is generated in step d).

11. The method of claim 1, further including a step of optimizing said state-based program generated in step d).

12. The method of claim 11, wherein the optimization is performed with respect to the number of states.

13. The method of claim 1, wherein non-local conditions in said sequence descriptions of said system are replaced in step a) by local conditions in accordance with a predetermined surjective mapping.

14. The method of claim 1, wherein the method is used for at least one of generating a state-based program for a telecommunication application and generating a state-based program for providing an error tolerant communication of data and generating a state-based program for providing an error tolerant communication of messages and generating a state-based program for a reactive system and generating a state-based program for a control system and generating a user interface program and generating a data base query schema program.

15. An apparatus for automatically generating a state-based program for a component of a system consisting of a plurality of components communicating with each other, wherein said program is generated from a specification of said system, said specification comprising interaction-based sequence descriptions of said system, said apparatus comprising a general purpose computer programmed for executing the steps of:

a) determining all sequence descriptions of said component defined by said specification of said system, b) normalizing said sequence descriptions of said component such that a normalized sequence description comprises exactly one initial condition and exactly one final condition and, between said initial condition and said final condition, communication actions only, c) determining a state-based specification of said component by identifying all equal initial and final conditions of said normalized sequence descriptions of said component with a single state, and d) determining said state-based program for said component, wherein each sequence description contained in said state-based specification of said component is replaced by a sequence of said communication actions of this sequence description, separated by additionally inserted states.

16. The apparatus of claim 15, wherein step b) comprises the following sub-steps:

b1) inserting a condition prescribed in said specification of said system as an initial condition into each of those sequence descriptions of said component that begin with a communication action, b2) inserting a condition prescribed in said specification of said system as a final condition into each of those sequence descriptions of said component that end with a communication action, and b3) splitting all sequence descriptions of said component having more than two conditions into a plurality of sequence descriptions of said component, each of the split sequence descriptions having exactly two conditions.

17. The apparatus of claim 15, wherein said apparatus is used for at least one of generating a state-based program for a telecommunication application and generating a state-based program for providing an error tolerant communication of data and generating a state-based program for providing an error tolerant communication of messages and generating a state-based program for a reactive system and generating a state-based program for a control system and generating a user interface program and generating a data base query schema program.

18. A computer program product for execution by a general purpose computer for automatically generating a state-based program for a component of a system consisting of a plurality of components communicating with each other, wherein said program is generated from a specification of said system, said specification comprising interaction-based sequence descriptions of said system, said computer program product including instructions for making said general purpose computer perform the steps of:

a) determining all sequence descriptions of said component defined by said specification of said system, b) normalizing said sequence descriptions of said component such that a normalized sequence description comprises exactly one initial condition and exactly one final condition and, between said initial condition and said final condition, communication actions only, c) determining a state-based specification of said component by identifying all equal initial and final conditions of said normalized sequence descriptions of said component with a single state, and d) determining said state-based program for said component, wherein each sequence description contained in said state-based specification of said component is replaced by a sequence of said communication actions of this sequence description, separated by additionally inserted states.

19. The computer program product of claim 18, wherein step b) comprises the following sub-steps:

b1) inserting a condition prescribed in said specification of said system as an initial condition into each of those sequence descriptions of said component that begin with a communication action, b2) inserting a condition prescribed in said specification of said system as a final condition into each of those sequence descriptions of said component that end with a communication action, and b3) splitting all sequence descriptions of said component having more than two conditions into a plurality of sequence descriptions of said component, each of the split sequence descriptions having exactly two conditions.

20. The computer program product of claim 18, said computer program product being used for at least one of generating a state-based program for a telecommunication application and generating a state-based program for providing an error tolerant communication of data and generating a state-based program for providing an error tolerant communication of messages and generating a state-based program for a reactive system and generating a state-based program for a control system and generating a user interface program and generating a data base query schema program.

\* \* \* \* \*